Aug. 8, 1967 R. M. HELLER ETAL 3,335,409

PERMUTATION APPARATUS

Filed June 25, 1964 10 Sheets-Sheet 1

WITNESSES

Edwin E. Bassler

John G. Chopp

INVENTORS

Ralph M. Heller, James R. Bowen,
Keith R. Schreiber & Abraham H. Trock

BY Ernest P. Klipfel

ATTORNEY

Aug. 8, 1967 R. M. HELLER ETAL 3,335,409

PERMUTATION APPARATUS

Filed June 25, 1964 10 Sheets-Sheet 3

PERMUTATION APPARATUS

Filed June 25, 1964

Aug. 8, 1967 R. M. HELLER ET AL 3,335,409

PERMUTATION APPARATUS

Filed June 25, 1964 10 Sheets-Sheet

United States Patent Office 3,335,409

Patented Aug. 8, 1967

3,335,409

PERMUTATION APPARATUS

Ralph M. Heller, Baltimore, James R. Bowen, Catonsville, Keith R. Schreiber, Baltimore, and Abraham H. Trock, Randallstown, Md., assignors to Westinghouse Electric Corporation, Pittsburgh, Pa., a corporation of Pennsylvania Filed June 25, 1964, Ser. No. 377,987
10 Claims. (Cl. 340—172.5)

ABSTRACT OF THE DISCLOSURE

Time-diversity coding of a time-divided sequence of pulses is effective in combating a fading transmission channel. The present invention interlaces and reforms the error-correcting code words at the transmitter and receiver respectively. Iterative logic core matrix storage interlaces the code words to permit a continuous flow of information. Read-in, read-out, and addressing equipment cycles the core matrix through alternate vertical and horizontal write and read-out modes.

The present invention relates generally to permutation apparatus and more particularly to apparatus for time-diversity coding of a time-divided sequence of pulses which are binary in character.

The present invention, among other uses, is capable of implementing time-diversity coding in a data transmission system of the type described and claimed in co-pending application Ser. No. 377,979, filed June 25, 1964, entitled "Antifading Error Correction System," by Ralph M. Heller, inventor, assigned to the present assignee. As more fully described therein, time-diversity coding of a time-divided sequence of pulses is effective in combating a fading transmission channel. At the transmitter, individual bits located adjacent each other in the bit stream to be transmitted are separated in time by the length of an expected fade in the transmission medium. The gaps between the bits of any particular word are filled by bits from other words arranged in a similar fashion. At the receiver, the time-diversity coded bit stream is re-formed to the same order that the stream had prior to coding.

In order to time-diversity code and decode binary bits to be transmitted in a stream, permutation and inverse permutation apparatus is needed at the transmitter and receiver, respectively. As the transmitter a storage holds a predetermined number of words so that thier bits can be interlaced. At the receiver a storage takes the scrambled bit stream and holds it so the words can be re-formed.

It is desirable when time-diversity coding, to maintain continuity of transmission and data flow with a minimum of complexity. The storage cannot be merely filled up to capacity and then read out in a scrambled manner. There are bits continually streaming into the storage, and these must also be simultaneously placed in a convenient format for the time-spread read-out.

In order to maintain continuity of transmission, permutation apparatus having a pair of equal, independent storage devices could be located at each site. One storage unit would be loaded with incoming data while the second storage unit is being read out. Then their roles would be reversed and the second storage unit would be loaded with new data while the other is being read out. Such apparatus, however, has the obvious disadvantage of failing to make a maximum use of the available storage and the added cost of additional memory units is preferably avoided.

An object of the present invention is to provide permutation apparatus for a data transmission system to provide transmission continuity with a minimum of equipment cost and complexity.

Another object of the present invention is to provide apparatus for time-diversity coding of digital data which permits a continuous flow of information while utilizing a minimum of read-in, read-out and addressing equipment.

Another object of the present invention is to provide permutation apparatus for a digital data transmission system in a fading medium which may be modified to suit the length of expected fade duration in the medium.

A broader object, in accordance with a more general use of the apparatus, is to provide economical apparatus for time-spreading a bit stream for any purpose whatsoever.

Briefly, the permutation apparatus includes a plurality of sections arranged in sequence, each including rows and columns of memory elements, each row and column containing a number of elements equivalent to the number of binary bits in a word. Initially, words may be written into the rows or columns; that is, for example, in a horizontal direction or a vertical direction. The words are written sequentially into like rows or columns in each section and the writing of words in the stream progresses through all the rows or columns.

Assuming that words have been written into the rows, then the bits of each word are scrambled or time-diversity coded by reading out the binary bits in a column progressing through like columns through all the columns in the apparatus. After reading out the binary bit stored in any particular memory element, a new bit from the bit stream is written into that element. If the read-write cycle is considerably shorter than the time of a bit in the information stream the new bit can be written into that element during the time of the particular bit. In such a manner, reading of information out of and writing of new information into the matrix is alternately performed in horizontal and vertical directions. Hence, adjacent bits of a word written into the matrix are separated in the bit stream being read out of the matrix by a bit from each other word stored in the matrix. Adjacent bits of a word stored in a row or column are read out only after all bits similarly located in like columns or rows are read out.

A similar but inverse permutation device located at the receiver is synchronized to duplicate the procedure at the transmitter so that the words can be re-formed in their proper sequence in the bit stream.

Further objects and advantages of the present invention will be readily apparent from the following detailed description taken in conjunction with the drawing in which.

Figure 3:
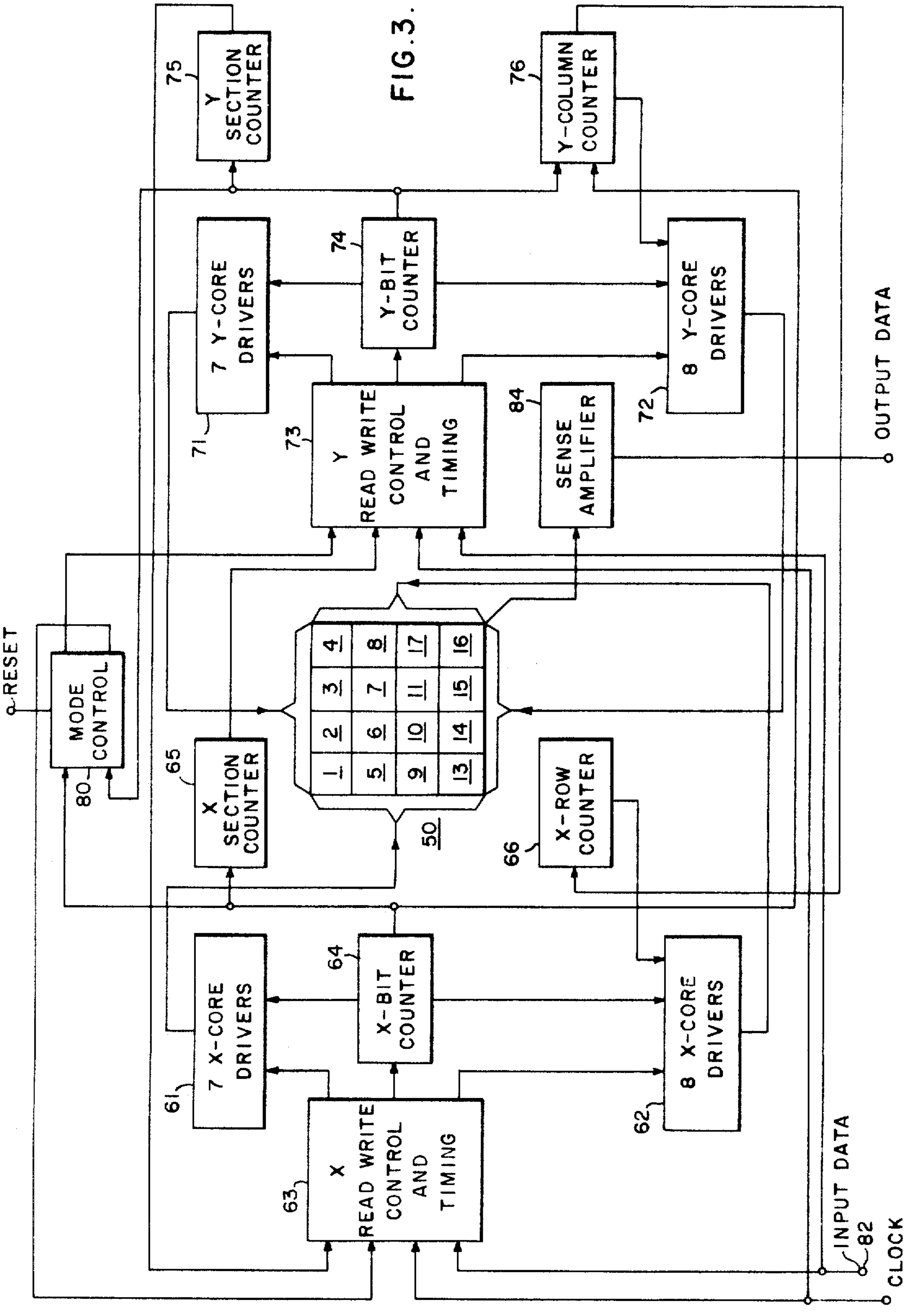
FIG. 3 is a block diagram of an illustrative embodiment of the present invention.
Figure 4A:
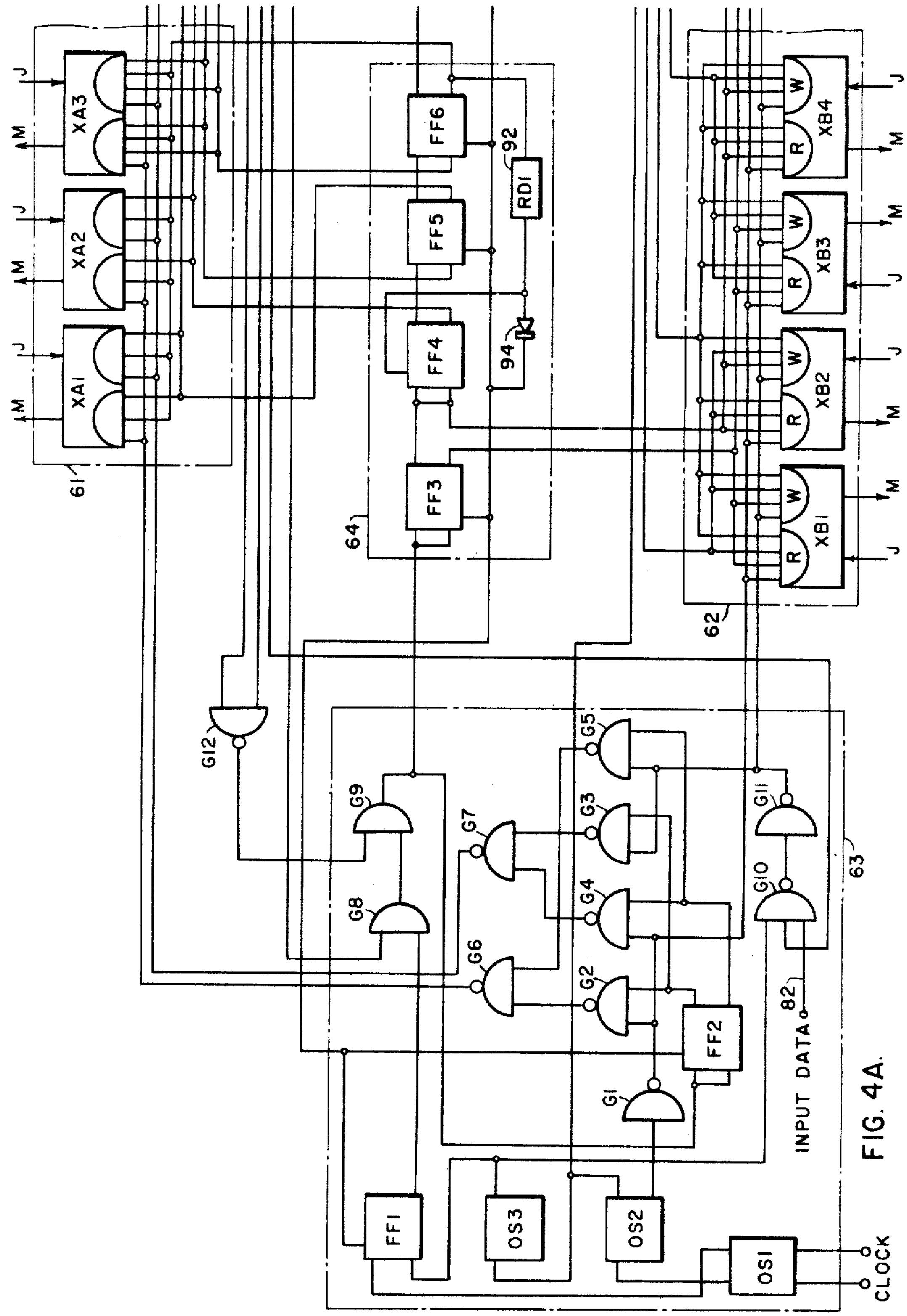
Figure 4B:
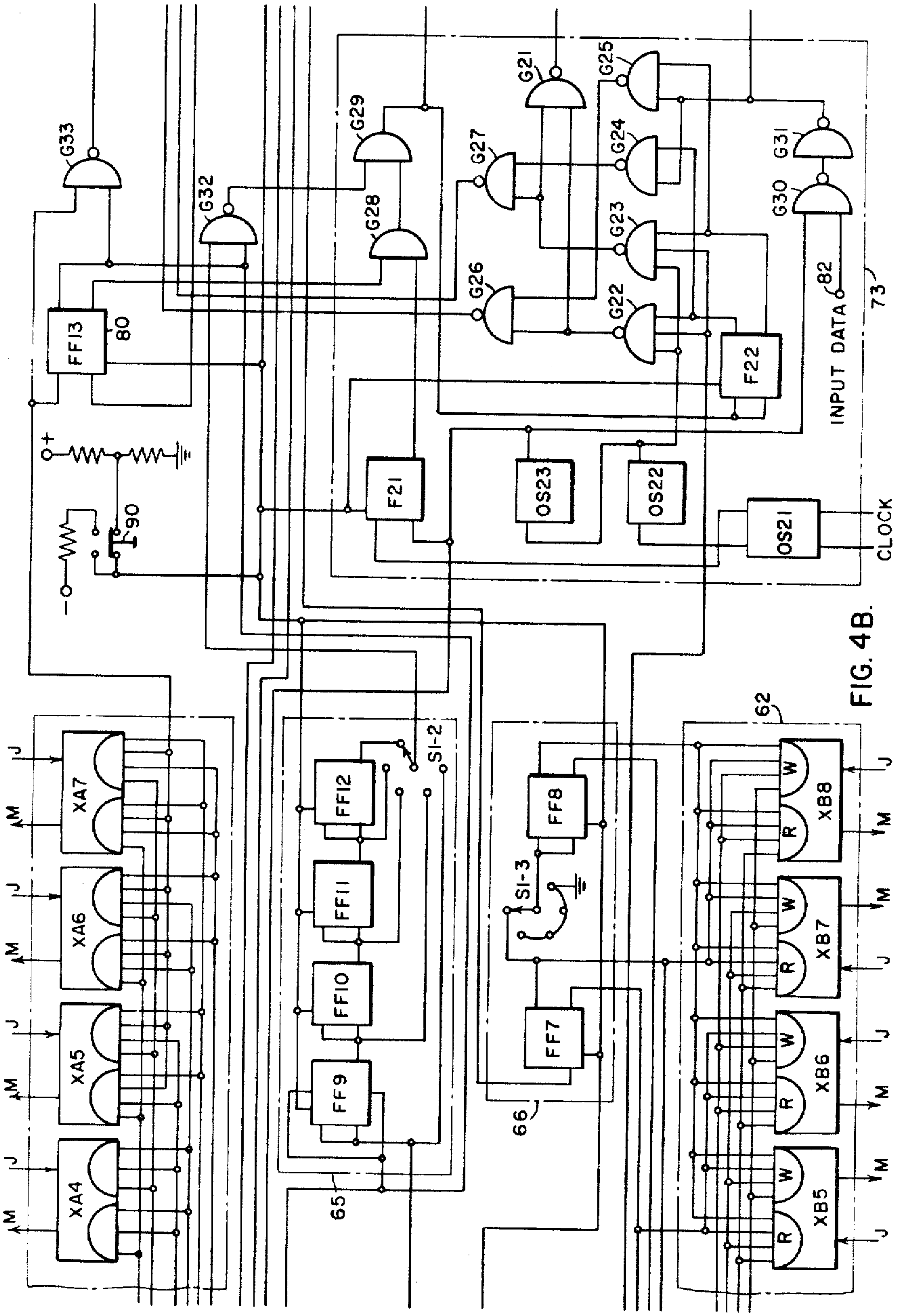
Figure 4C:
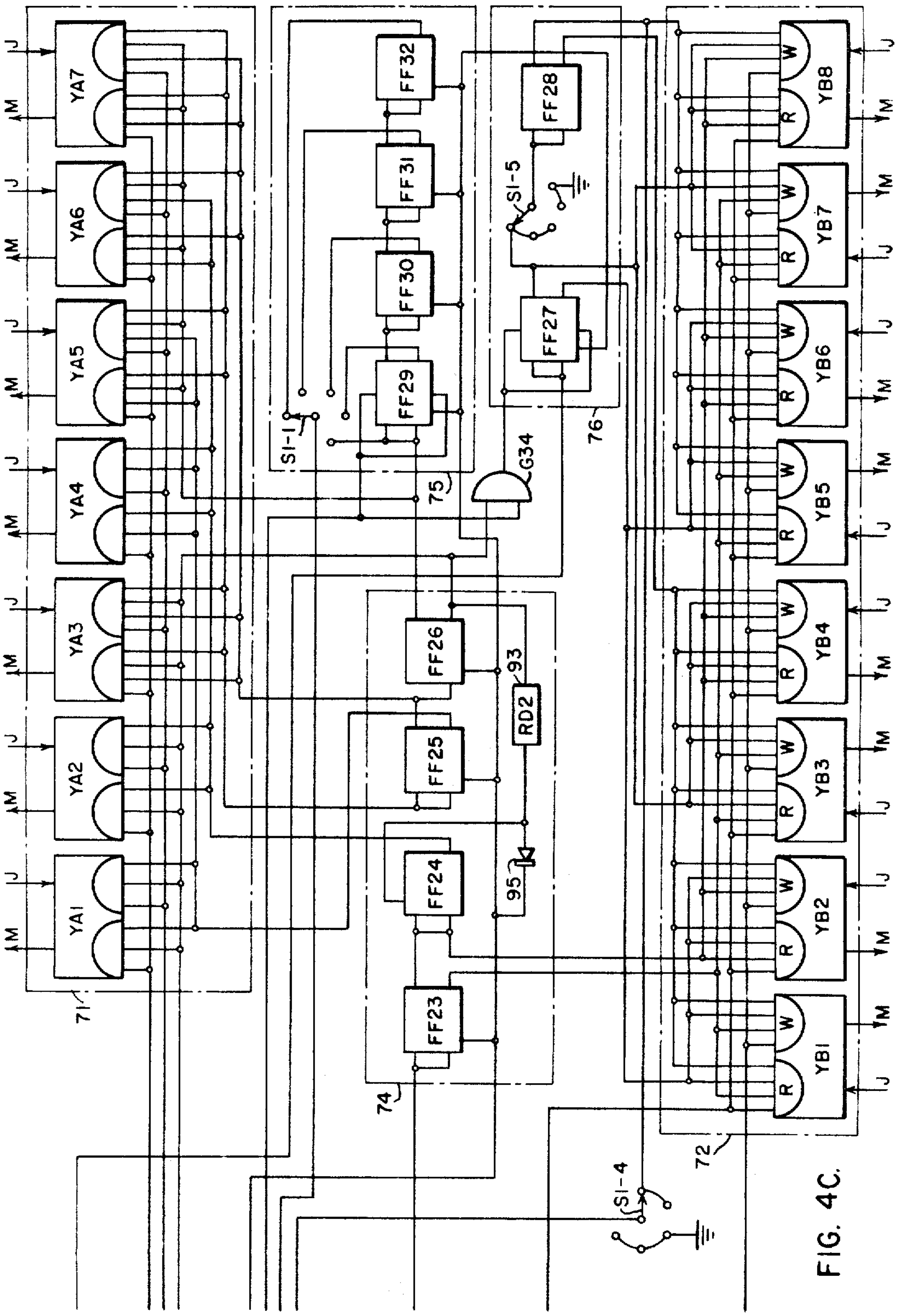
Figure 5A:
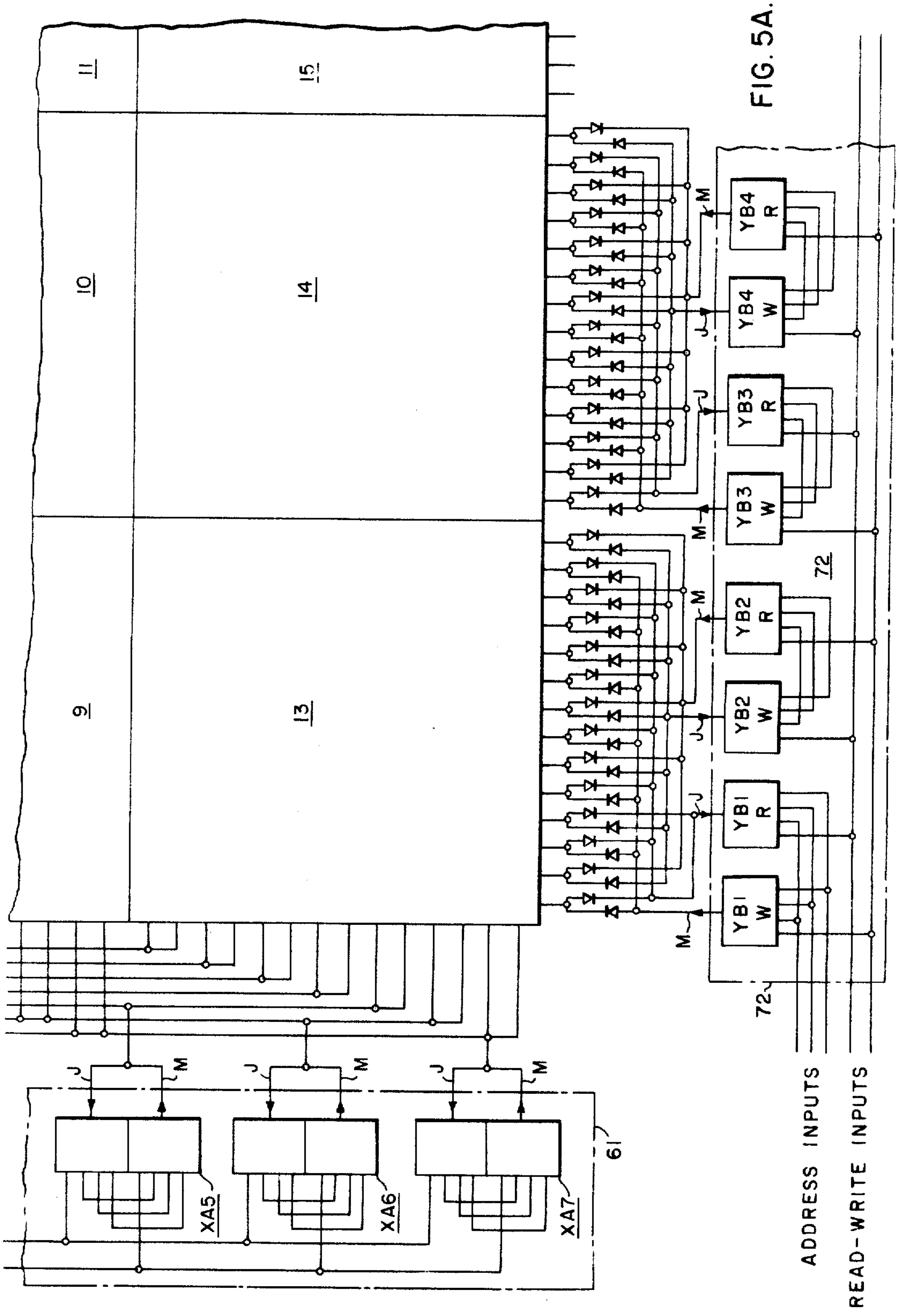
Figure 5B:
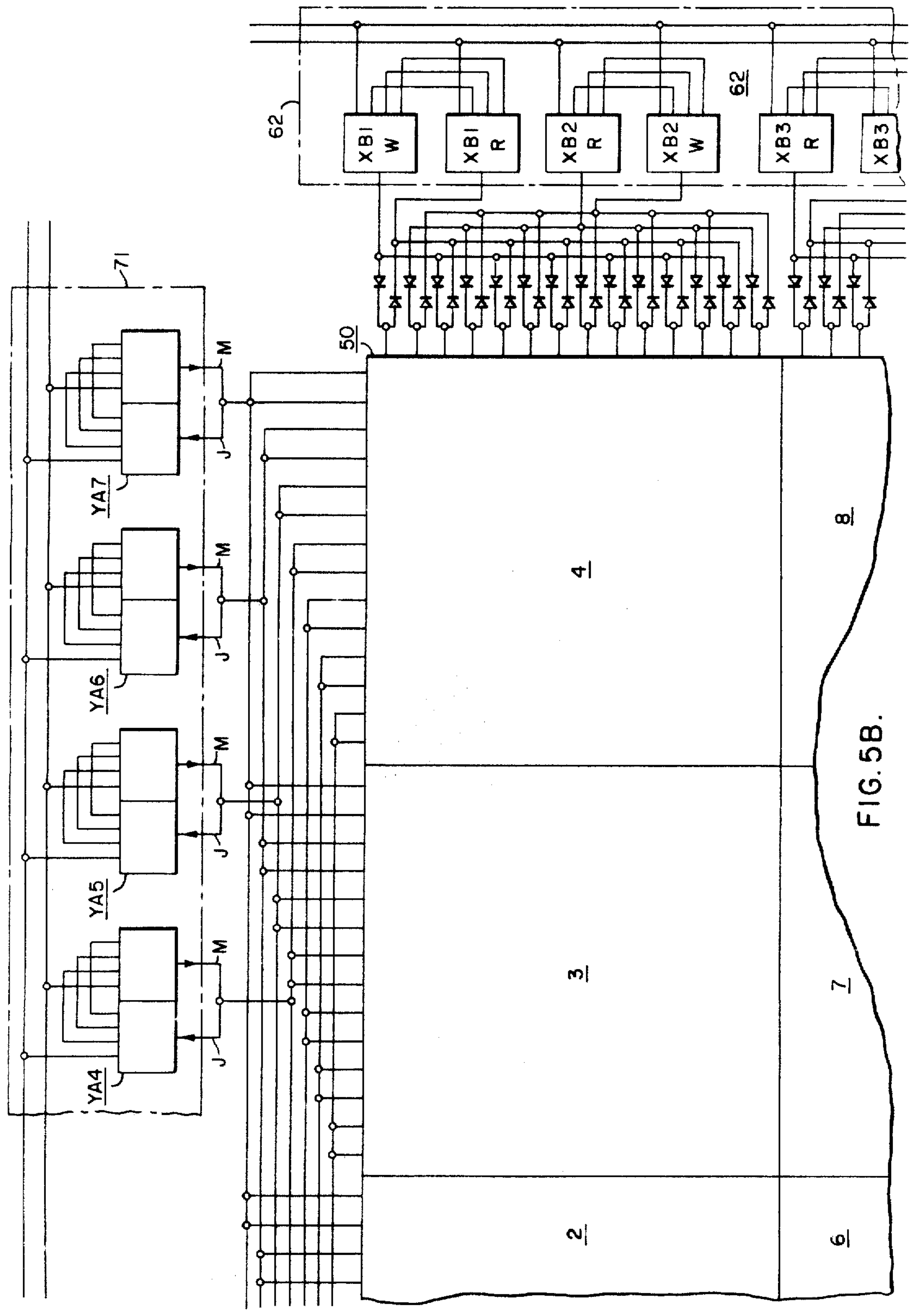

FIGS. 4A, 4B and 4C combine to show a detailed block diagram of the timing and control of the illustrative embodiment shown in FIG. 3; and FIGS. 5A and 5B are fragmentary electrical schematic diagrams of the read-write and memory portions of the illustrative embodiment shown in FIG. 3.

Figure 1:
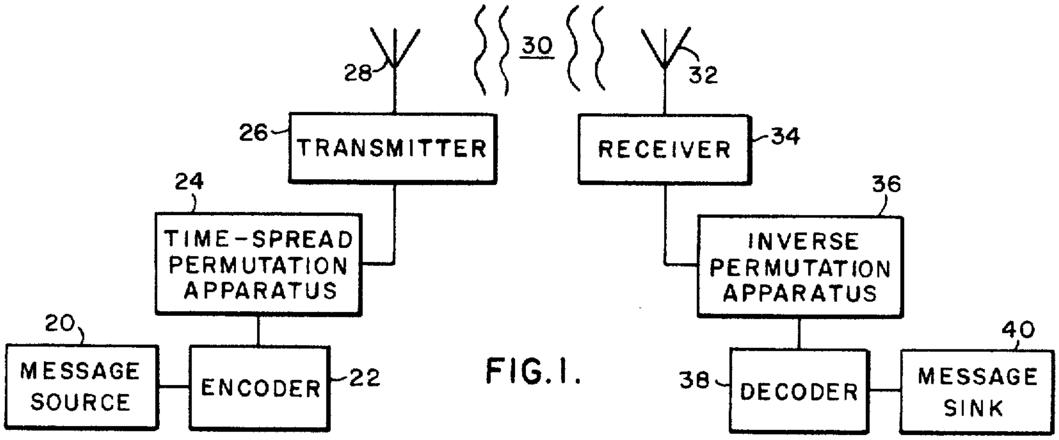
FIGURE 1 is a block diagram of a data transmission system utilizing the present invention.

A block diagram of a complete communications system using apparatus for time-diversity coding is shown in FIG. 1. The system chosen for purposes of illustration may be utilized, for example, in the transmission of binary bits in the form of pulses in teletype channels over a scatter medium where the expected fade duration might be up to 5 seconds.

More specifically, a message source 20 in the form of a typewriter or computer provides two 5-bit teletype characters to an encoder 22 wherein four bits are added to each two teletype characters for error correcting coding to make a word containing 14 bits. For the purposes of this illustration, a word contains 14 binary bits. Each word in the coded message progresses from the encoder 22 to a time-spread permutation apparatus 24. When no error correcting coding is necessary, the usual 7-bit teletype character including the start and stop bits may be inserted directly from the message source 20 to the permutation apparatus 24 with two 7-bit characters making up a word. It is to be understood however that a word of any number of bits may be used and the use of a 14-bit word in a teletype system is merely by way of illustration.

The permutation apparatus 24 receives coded messages from the encoder 22 and time-diversity codes or spreads the message in accordance with the expected time duration of fade that may be encountered in the transmitting medium. The bit stream of coded messages after spreading is sent to a transmitter 26 and through the antenna 28 is placed in the transmission medium 30.

Another antenna 32 receives the binary bit stream of pulses and directs the same to a receiver 34 wherein the received spread messages with errors are directed to an inverse permutation apparatus 36 which re-forms the coded messages, now with transmission errors, to their normal sequence of bits as the bits were arranged before spreading by the permutation apparatus 24. A 14-bit decoder 38 corrects the messages and forwards them to a message sink 40. If no error correction has been employed, the decoder 38 is bypassed; that is, the inverse permutation apparatus 36 is connected directly to the message sink 40.

A diagrammatic illustration of the operation of the permutation apparatus 24 and 36 is shown in FIG. 2. A memory matrix 50 of a plurality of sections 1 through 16, arranged in rows and columns, each includes a plurality of storage elements E disposed in rows and columns within their respective sections 1 through 16. While the storage elements E may be of any suitable type, magnetic cores have herein been illustrated. Further, if a normal slow teletype rate of 45 bits per second and a maximum expected fade duration of approximately 5 seconds is assumed, then in order to spread the time between adjacent bits of any word to 5 seconds, a total of 224 bits must be provided between adjacent binary bits of a word. 224 bits will be transmitted at the normal slow teletype rate during a fade of approximately 5 seconds. Accordingly, to spread adjacent bits of any word over a fade duration of 5 seconds requires that the adjacent bit be withheld from transmission in the medium for at least 224-bit times. During the time between adjacent bits in the bit stream, bits from other words are inserted and, in turn, arranged in a similar fashion. The maximum capacity of the matrix for the illustration chosen is, therefore, equal to 224 14-bit words or 3,136 cores for the storage of that many binary bits.

Figure 2D:
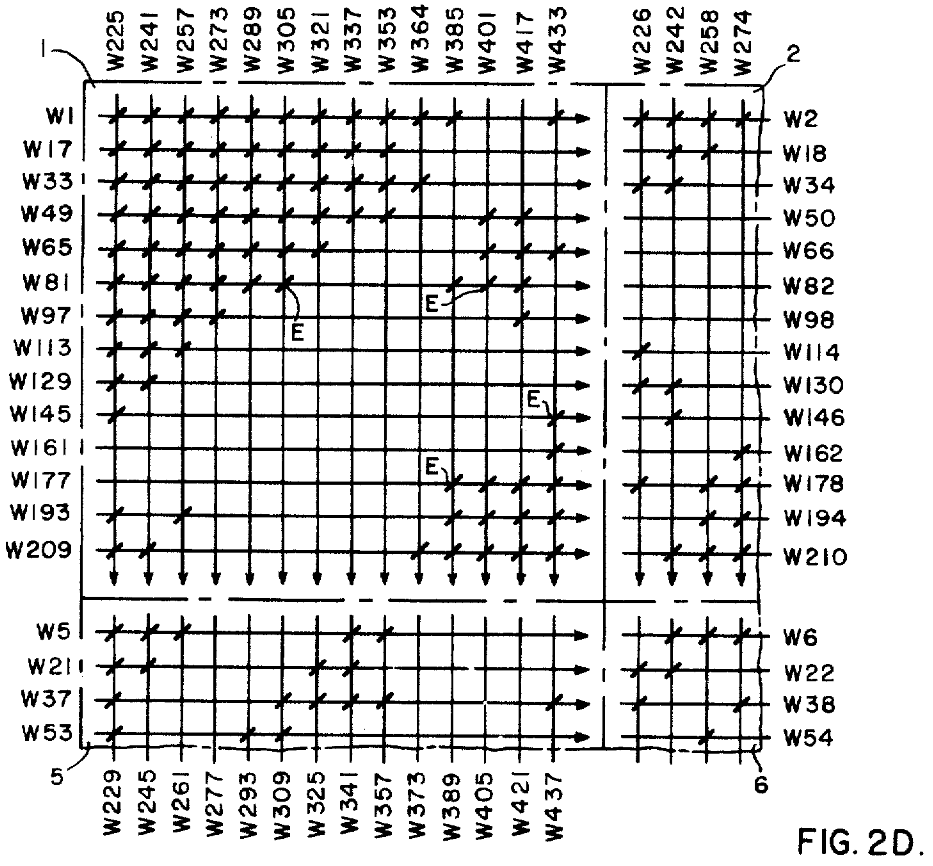
FIGS. 2A, 2B, 2C and 2D are diagrammatic illustrations helpful in understanding the operation of the present invention.
Figure 2A:
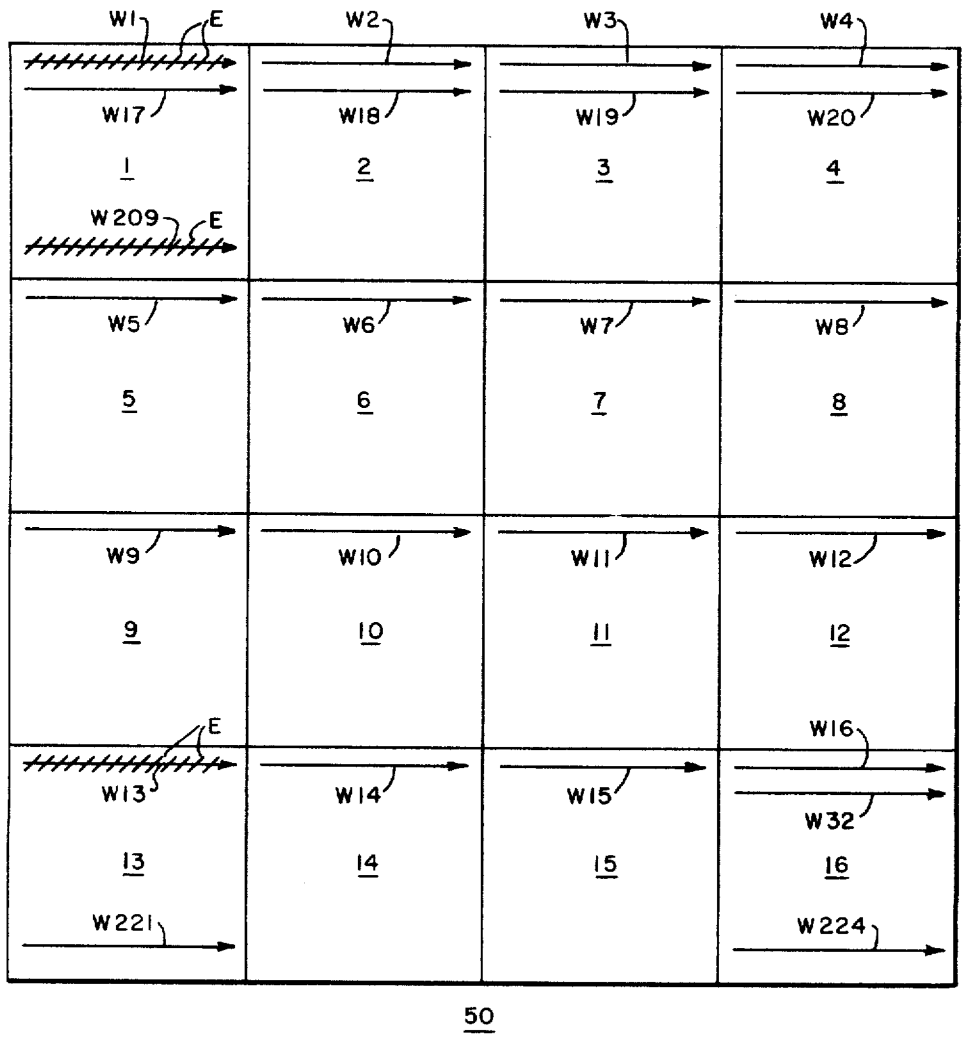
Figure 2B:
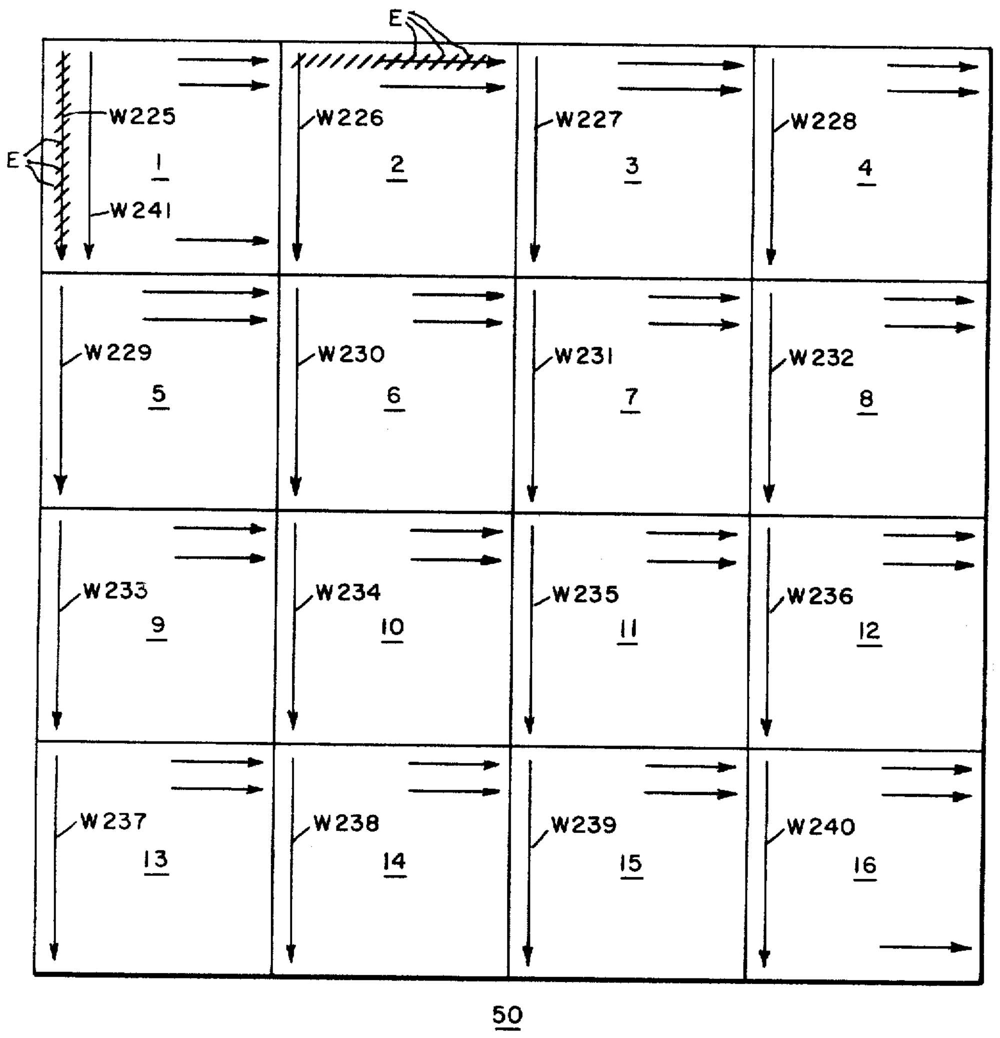
Figure 2C:
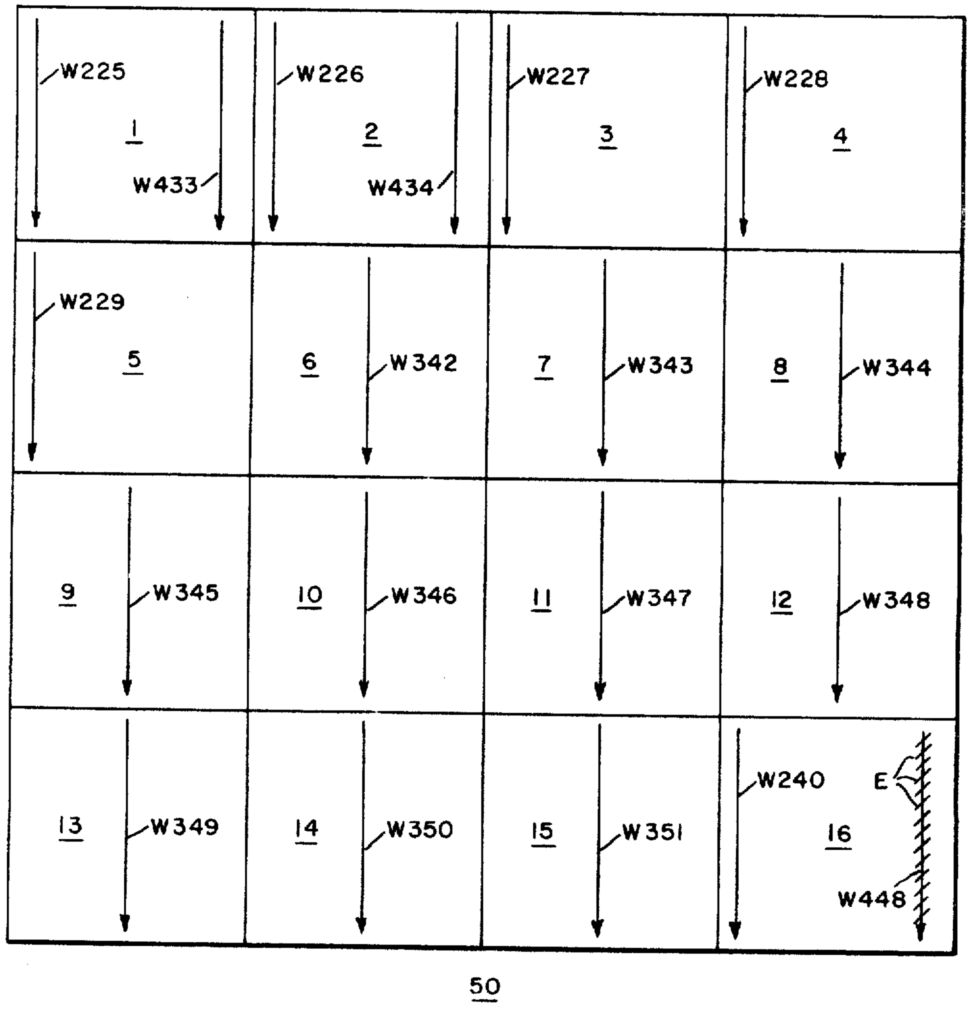

FIGS. 2A, 2B and 2C show how continuous word flow of binary bits is maintained by the permutation apparatus 24 at the transmitter. FIG. 2A shows how the first 224, 14-bit words emanating from the encoder 22 are placed into the core matrix. It is to be noted that each section 1 through 16 contains 196 memory core elements E also disposed in rows and columns of 14 elements each within each section. Words W1 through W16 in the time-divided bit stream being received by the permutation apparatus 24 are written into the core matrix across the first row of each of the 16 sections. Words W17 through W32 are written into the second lines of each of the 16 sections in turn. The process is continued until the 224th word is read into the last row of section 16. FIG. 2A illustrates the core matrix filled with words disposed in each row, or in a horizontal direction. The matrix is then read out and loaded by columns or in a vertical manner. As will be more fully described hereinafter, the next binary bit in the stream received by the permutation apparatus is written into each memory element after reading information out of that element.

FIG. 2B shows the matrix configuration during the middle of reading out the first load and inserting of the second load. It is to be noted that bits stored in words orientated in rows are now read out in columns. As each binary bit is read out of a column of elements a new bit received by the apparatus from the bit stream is read into that element. The bits contained in the first columns of the sections 1 through 16 are read out in sequence and words W225 through W240 are written into the matrix down the first columns of squares 1 through 16 to replace the information that was read out. In a like manner words W241 through W256 are read in and down the second columns, etc. Bit-by-bit serial read-out and write-in is performed so that the first bit of word W225 is written into the matrix just after the first bit of word W1 was read out. Thus, the first bit of 224 words followed by the second bit of the 224 words are sent out in sequence to the transmitter for sending through the medium or channel. By the time 224 new words have been written into the matrix, the word organization in the matrix will be as shown by FIG. 2C. With the core configuration as shown in FIG. 2C, after the first read-out cycle and the second complete loading cycle, the matrix is now of such configuration to be read out and loaded by rows or in the horizontal direction as shown in FIG. 2A. The matrix is then cycled through alternate rows and columns (horizontal and vertical) and reads out a binary bit from each memory element in the prescribed sequence with each binary bit as it is read out of an element being replaced with another binary bit from the stream inserted in its place.

The alternate modes of operation are duplicated in synchronism at the inverse permutation apparatus located with the receiver so that the words can be reformed and decoded properly. The duplication in synchronism of this procedure at the receiver site insures the reformulation of the words in the same order as they came out of the encoder 22. In such a manner transmission continuity in the medium or channel 30 is insured while using a minimum number of memory elements or cores and associated logic. No core location is ever empty for even one bit time.

As will be more fully described hereinafter, a switch is provided to permit the use of fewer sections of the core matrix if shorter fade times are expected thereby causing less overall delay in the communication channel.

FIG. 2D is a diagrammatic illustration of a single section 1 of memory elements E. The words that are written into section 1 during the cycle described by FIGS. 2A, 2B and 2C have been shown to more particularly illustrate the disposition of words within a particular section. While complete words would not be simultaneously disposed in the rows and columns they have nevertheless been drawn in that manner to show the location of all the words that one section can hold. In the cycle of operation upon completion of the last word W448 in section 16, the next word is shown to be the first word W1 again in section 1 although it could be designated word W449.

FIG. 3 shows a block diagram of the addressing and driving circuitry associated with the core matrix 50. The matrix 50 is of a configuration similar to that described with respect to FIG. 2; that is, a single 56 by 56 bit plane is divided into 16 square sections of 14 bits on a side. The apparatus is equally applicable to permutation at the transmitter site or inverse permutation at the receiver site.

Reading and writing is accomplished by addressing the core matrix 50 through coincident current drivers. For the chosen core matrix, 15 drivers are used for the X address and 15 drivers are used for the Y address. The X address is further divided into a group 61 of 7 X-core drivers and a group 62 of 8 X-core drivers disposed on opposite sides of the matrix 50 for ease of accessibility. An X read-write control and timing circuit 63 progressively enables the driver groups 61 and 62 to progress through the memory elements. A bit counter 64 identifies each bit in a word while a section counter 65 identifies each section of the matrix and a row counter 66 identifies which row of sections is being addressed.

The Y-core drivers are similarly divided into a group 71 of 7 Y-core drivers and a group 72 of 8 Y-core drivers. The groups 71 and 72 are progressively enabled by means of the read-write control and timing circuitry 73. A Y-bit counter 74, a Y section counter 75 and a column counter 76 identifies the location of any memory element within the matrix 50 in a manner similar to the row counters.

A clock (not shown) synchronizes the addressing controlled by circuits 63 and 73. A mode control circuit 80 alternately enables the X control and timing circuit 63 and Y control and timing circuit 73 to progress the read and writing through columns and rows as described previously with respect to FIG. 2.

If the apparatus is located at the transmitter site the input data terminal 82 is connected to a message source and a sense amplifier 84 will amplify information read out of the matrix 50 and feed the binary bits or pulses to the transmitting medium or channel through a transmitter. If the apparatus is located at the receiver site, then the input data terminal 82 will be connected to receive the time divided sequence of pulses or binary bits from the transmitting medium and receiver. The sense amplifier 84 will then be connected to a decoder or message sink.

In operation, when writing in the rows or horizontal mode, the Y-bit counter 74 is enabled by the mode control 80 through the circuit 73. The Y-bit counter 74 identifies any one of the 14 bits in a row and drives the Y section counter 75 and Y column counter 76 after the completion of each 14 bit count of a word. Counters 75 and 76 advance one step for every 14 counts of counter 74. The Y column counter 76 will count four cycles of the Y-bit counter 74 before advancing the X-row counter 66 one step. The Y section counter 75, however, will count 16 complete cycles of the Y-bit counter 74 before advancing the X-bit counter 64 one step through the X read-write control and timing circuit 63. Each advancing count of the Y section counter 75 to the X-bit counter 64 indicates that 224 (16 by 14) bits have been addressed. Transition from the row or horizontal mode to the column or vertical mode will occur at the end of the 14th count of the X-bit counter 64. The total number of bits addressed during either mode must be 3,136 bits (224×14) for the case illustrated.

To operate in the column or vertical mode the X-bit counter 64 is enabled by control 80 through the circuit 63. The Y-bit counter 74 is driven by the most significant bit of the X section counter 65 through the Y control and timing circuit 73. The X-bit counter 64 not only drives the X section counter 65, but in the vertical mode is also connected to the Y column counter 76 and thus for every 14 counts of the X-bit counter 64, the X section counter 65 and Y column counter 76 will advance one step. The Y column counter 76 always driving the X row counter 66 will again as in the horizontal mode, count four complete input cycles before advancing the X row counter 66 one step. The X section 65 performs the same function as does the Y section counter 75 and will count 16 complete cycles of the X-bit counter 64 before advancing the Y-bit counter 74 through the control and timing circuit 73. The Y-bit counter 74 is advanced when 224 bits have been addressed. The transition from the column mode back to the row mode, in this case, occurs at the end of the 14th count of the Y-bit counter 74. The total number of bits addressed in the column mode is, of course, the same as the number of bits addressed in the row mode; that is, 3,136 bits.

A detailed circuit diagram of the addressing logic is included in FIG. 4, wherein like circuits have been designated with the same reference characters used in FIG. 3.

The X and Y read-write control and timing circuits 63 and 73 receive the data stream and clock synchronizing pulses to produce the read and write cycle enable signals to the AND gates R and W contained in the respective core drivers 61, 62, 71 and 72. The read out and write in cycle for each bit occurs in that order at the beginning of each bit. The read out and write in at any particular memory element E occurs during the same bit time. A read and write pulse cycle is made to be of a short duration compared to the bit time. For example, a bit time at 45 c.p.s. is 0.022 second which is a normal teletype rate. By making the read out and write pulses each of 4 microsecond duration any bit rate with a bit time greater than say 15 microseconds will provide adequate time with allowance for some separation to perform both operations during the same bit time. Not only must the timing for the read and write pulses be generated for each of the X and Y units but a timing relation must be maintained between the X and Y drive. This is performed by the monostable multivibrators (one-shots) OS1, OS2 and OS3 of circuit 63 and OS21, OS22 and OS23 of circuit 73.

In addition, the direction of one of the selecting currents (either X or Y) must be reversed from one bit position to the next due to the physical orientation of one core element in relation to the next. In circuit 63 this is accomplished by Flip-Flop FF2 and NAND gates G2, G4, G3, G5, G6 and G7 all of which are also controlled by the incoming data through Gates G10, and G11. In a like manner Flip-Flop FF22 and Gates G22, G23, G24, G25, G26 and G27 controlled by Gates G30 and G31 accomplish the same result in circuit 73. Flip-Flops FF1 and FF21 produce retimed clock pulses for the respective circuits 63 and 73.

The Y-bit counter 74 is a modified 4-bit binary counter which is capable of selecting, through decoding, any single bit in a 14-bit section. A 4-bit binary counter would normally count to 16 but the Y-bit counter 74 has been modified to count only to 14. The Y section counter 75 as well as the X section counter 65 is a 4-bit binary counter including 4 Flip-Flops connected in the usual manner to maintain a square count, that is, from 1 to 16. The Y column counter 76 and X row counter 66 are 2-bit binary counters including 2 Flip-Flops and, as the names imply, select one of the four X rows and Y columns of sections. Counters 64 and 74 as well as 66 and 76 not only provide the addressing previously mentioned but also furnish timing and synchronization between the X and Y drive units. The section counters 65 and 75 perform in a timing function only. The driver sections 61, 62, 71 and 72 each include the prescribed plurality of read and write lines and AND elements for selecting which core driver is to be used. The read-write lines to the matrix are energized with a high current driving circuit.

A master reset button 90 provides means for resetting every Flip-Flop in the circuit. The reset drivers 92 and 93 are used only for a reset which forces the counters 64 and 74 to repeat after 14 counts. An isolation diode 94 and 95 for each counter 64 and 74 separates the master reset from the normal cycle reset of the counters.

On occasion, fades of shorter duration than the 5 seconds previously proposed may be expected in the transmission medium. Switching means SI–1 through 5 allow the selection of less sections of the matrix. One, two, four or eight of the 16 sections may be connected in the circuit. To reduce the matrix 50 (FIG. 2) from 16 sections to 8 sections the last two rows, sections 9 through 16, are cut out. For 4 sections the second row (sections 5 through 8) is eliminated. Notice that no reduction is made in the column counter 76 which is still counting four columns when 4 sections are connected in the matrix. To reduce from 4 to 2 sections, the last two columns (containing sections 3 and 4) are eliminated and finally the second column (section 2) leaving section 1 containing 14 x 14 bits in the first row and first column of the array of sections. Counters 64 and 74 are never altered in size since even in the smallest memory matrix (14 x 14 bits) a count of fourteen must be had. The switches SI–1 through 5 alter the length of the row and column counters 66 and 76 and the timing selected from the section counters 65 and 75. Thus, protection against shorter fades of 14, 28, 56 and 112 bits duration can be provided while causing less overall delay in the communication channel.

FIGS. 5A and 5B show the connections from the drive elements to the core matrix 50. FIG. 5A is chosen to illustrate the lower left hand corner of the matrix 50 and the drivers connected thereto while FIG. 5B illustrates connections to the upper right hand corner of the matrix. The X section 61 containing 7 drivers is positioned on the left-hand side of the matrix and the X section 62 of 8 drivers is positioned on the opposite side. The Y section 71 of 7 drivers is positioned on the top side of the matrix and the Y section 72 of 8 drivers is disposed on the opposite side. The string of diodes disposed with the X and Y drivers provides isolation therebetween. Otherwise the drivers would falsely select memory elements. Their use permits a reduction in the number of driver circuits required. A typical arrangement for address inputs and read-write inputs is illustrated with the Y section 72 of core drivers.

While the present invention has been described with a degree of particularity for the purposes of illustration, it is to be understood that all modifications, alterations and substitutions within the spirit and scope of the present invention are herein meant to be included. For example, while the memory elements disposed in the matrix have been referred to as magnetic core elements, it is to be understood that any memory element, including sonic delay lines, may be utilized. Even though the matrix has been illustrated as a series of 16 sections disposed in rows in columns, the sections may be disposed in any geometrical configuration so long as the sequence is maintained. It is of no consequence that the sections are disposed in four rows and columns even though such an arrangement has been chosen for the purpose of illustration. With the arrangement illustrated, particular row and section counters are necessary. It is to be understood that any sequence of sections is herein meant to be included as long as the alternate row and column modes for addressing bits within the memory matrix is obtained.

When desirable, the next bit in the information stream coming into the permutation apparatus may be written into a storage element one bit time after reading the stored bit out of that element or any number of bit times later. The gap in time between reading and writing is in general unrestricted. If a time gap is chosen which is inconvenient for the implementation illustrated, then additional memory and minor circuitry changes are required.

While a 14-bit word has been assumed for purposes of illustration, any number of bits may be held to constitute a word. However, the number of bit-storage elements in a row or column should be equal to the number of bits in a word.

We claim as our invention:

1. Apparatus for time-diversity coding of data to be transmitted in a time-divided sequence of binary bits at a predetermined number of bits per second comprising, in combination: a plurality of sections arranged in sequence and each including a plurality of storage elements disposed in rows and columns; read and write means operatively connected to each element for writing information into each element after reading information out of that element; and selective means for enabling said read and write means of each element in a row of a section and progressing through like rows of elements in each section and further progressing through all of the rows of each section and for enabling said read and write means of each element in a column of a section and sequentially through like columns of elements in each section and progressing through all of the columns of each section.

2. Apparatus for time-diversity coding of data to be transmitted in a time-divided sequence of binary bits at a predetermined number of bits per second, comprising in combination: a plurality of sections arranged in sequence and each including a plurality of storage elements disposed in rows and columns; input means for receiving said time-divided sequence of bits; read and write means operatively connected to each element for reading a stored bit out of an element if one is present and writing a bit received by said input means into that element during the same bit time; selective means for enabling the read and write means progressively through elements located in like rows of each section, progressing through each like row in each section and similarly through all of the other rows of each section and for enabling the read and write means operatively connected with each element in a column to function in a duplicate manner but only upon completion of the first cycle.

3. Apparatus for time-diversity coding of a time divided sequence of binary bits comprising, in combination: a plurality of sections arranged in sequence and each including a plurality of storage elements disposed in rows and columns; first means for sequentially reading information out of and writing information into like rows of elements in each section and progressing through all of the rows of each section; second means for sequentially reading information out of and writing information into like columns of elements in each section and progressing through all the columns of each section; and mode control means for alternately enabling said first and second means upon completion of a sequence by said first means or second means.

4. In time-diversity coding apparatus the combination comprising; input means for receiving a time-divided sequence of binary bits; a fixed number of bits being in each word; a plurality of sections arranged in sequence and each including a plurality of storage elements disposed in rows and columns, the number of elements in each row and column being equal to the number of bits in a word; means operatively connected to each element for reading and writing a bit out of and into said element in a read-write cycle time which is shorter than the time duration of a bit; first means for enabling said read and write means, as each binary bit is received by said input means, to progress through each element of a row in a section and similarly through like rows in each section in sequence and progressing through all the rows in each section; second means for enabling said read and write means, as each binary bit is received by said input means, to cycle through each element of a column in a section, through like columns in each section in sequence and progressing through all of the columns in each section; means responsive to the completion of a cycle by either means for enabling to initiate the other means for enabling to commence its cycle of operation; and output means for sensing the reading out of information by said read and write means whereby a bit stream having each bit of a word separated in time by a bit of each other word contained in said plurality of elements is provided.

5. A permutation device for changing the lineal order of a time-divided sequence of pulses which are essentially binary in character, a fixed number of pulses being in each word, comprising in combination; a plurality of sections arranged in sequence and each including a plurality of storage elements disposed in rows and columns, the number of elements in each row or column being equal to the number of pulses in a word; read and write means operably connected to each element for reading a stored pulse out of each element and writing into that element the next pulse of said time-divided sequence of pulses; said read and write means having a first mode of operation and a second mode of operation, in said first mode the read and write means progresses through each element of a row and sequentially through like rows of elements in each section, progressing through all the rows of each section and in said second mode, the read and write means progresses through a column of elements and sequentially through like columns of elements in each section, progressing through all the columns of each section; and means responsive to the completion of one mode of operation of said read and write means for enabling said read and write means to the other mode of operation.

6. A permutation device for changing the lineal order of a time-divided sequence of pulses which are essentially binary in character, a fixed number of pulses being in each word, comprising, in combination; input means for receiving said sequence of pulses; a plurality of sections arranged in sequence and each including a plurality of storage elements disposed in rows and columns, the number of elements in each row or column being equal to the number of pulses in a word; read and write means operably connected to each element for reading a stored pulse out of each element and writing into that element the next pulse received by said input means; said read and write means alternating between a first mode of operation and a second mode of operation, said first mode resulting in the read and write means progressing through each element of a row in a section, through like rows of elements in each section and progressing through all of the rows of each section; said second mode resulting in the read and write means progressing through all the elements of a column in a section, through like columns of elements in all the sections and progressing through all the columns of each section; means responsive to the completion of one mode of operation of said read and write means for changing said read and write means to the other mode of operation; and means responsive to said read and write means for providing an output pulse each time the read and write means reads out an element whereby adjacent pulses received by said input means are separated, in time, by a pulse from each other word stored in said plurality of sections.

7. The apparatus of claim 6 wherein said read-write means includes a first counter for identifying a storage element for each bit in a word, a second counter for identifying the row or column in which said word is located; and a third counter for identifying the section in which said row or column is located.

8. The apparatus of claim 6 wherein said means for controlling the mode of operation of said read and write means includes a means for resetting said read and write means to a start position.

9. The apparatus of claim 6 including switching means to operably connect to said input means and output means a predetermined number of said sections for an expected time duration of fade whereby adjacent bits of a word are separated by the number of bits that can be transmitted during said expected time duration of fade at the transmission rate of said system.

10. Apparatus for time spreading adjacent bits of a word by the expected time duration of fade in a transmission medium, the words being transmitted at a predetermined rate of bits per second in a time-divided sequence, the apparatus comprising, in combination; a plurality of memory elements equal to the number of bits transmitted at said predetermined rate during said expected time duration of fade; the plurality of memory elements disposed in rows and columns; the number of memory elements in a row or column being equal to the number of bits in a word; read-write means for alternately addressing the elements arranged in a row or column, proceeding sequentially through each row or column; means for changing said read and write means to operate in column sequence when the row sequence is completed and to operate in row sequence when said column sequence is completed, whereby each bit of a word read out of an element by said read and write means is separated in time sequence by a like bit of each other word stored in said row or column.

References Cited

UNITED STATES PATENTS 3,063,536 11/1962 Dirks ---------------- 197—19

ROBERT C. BAILEY, *Primary Examiner.*

R. B. ZACHE, *Assistant Examiner.*